(12) United States Patent
Wuidart

(10) Patent No.: US 7,372,965 B1
(45) Date of Patent: May 13, 2008

(54) ELECTRIC CIRCUIT MANAGEMENT METHOD AND DEVICE

(75) Inventor: Sylvie Wuidart, Pourrieres (FR)

(73) Assignee: STMicroelectronics S.A., Montrouge (FR)

(*) Notice: Subject to any disclaimer, the term of this patent is extended or adjusted under 35 U.S.C. 154(b) by 0 days.

(21) Appl. No.: 09/979,408

(22) PCT Filed: May 18, 2000

(86) PCT No.: PCT/FR00/01347

§ 371 (c)(1),
(2), (4) Date: Mar. 11, 2002

(87) PCT Pub. No.: WO00/72117

PCT Pub. Date: Nov. 30, 2000

(30) Foreign Application Priority Data

May 21, 1999 (FR) .................................. 99 06499

(51) Int. Cl.
*H04L 9/00* (2006.01)
(52) U.S. Cl. ................ 380/285; 713/189; 713/300; 380/200; 380/54; 380/252

(58) Field of Classification Search .............. 380/54, 380/200–205; 713/189
See application file for complete search history.

(56) References Cited

U.S. PATENT DOCUMENTS

| | | | | |
|---|---|---|---|---|
| 4,932,053 A | * | 6/1990 | Fruhauf et al. | 380/252 |
| 5,345,112 A | * | 9/1994 | Nazarian et al. | 326/39 |
| 5,500,601 A | * | 3/1996 | Lisart et al. | 324/713 |
| 5,944,833 A | * | 8/1999 | Ugon | 713/400 |
| 5,995,629 A | * | 11/1999 | Reiner | 380/265 |
| 6,064,740 A | * | 5/2000 | Curiger et al. | 380/265 |
| 6,304,658 B1 | * | 10/2001 | Kocher et al. | 380/30 |
| 6,327,661 B1 | * | 12/2001 | Kocher et al. | 713/193 |
| 6,698,662 B1 | * | 3/2004 | Feyt et al. | 235/492 |
| 6,748,535 B1 | * | 6/2004 | Ryan et al. | 713/189 |

* cited by examiner

*Primary Examiner*—Emmanuel L. Moise
*Assistant Examiner*—Shewaye Gelagay
(74) *Attorney, Agent, or Firm*—Lisa K. Jorgenson; Stephen Bongini; Fleit Kain Gibbons Gutman Bongini & Bianco P.L.

(57) ABSTRACT

The invention proposes a method of managing an electronic circuit of the type comprising a memory (EEPROM) for the storage of confidential information, the method comprising masking variations of the electrical current (I) consumed by the electronic circuit, during a fraction of the time only ($t_i$-$t_j$), at least during the portion(s) of time during which an instruction bearing on confidential data is executed, and notably an instruction for reading out from the memory (EEPROM).

16 Claims, 2 Drawing Sheets

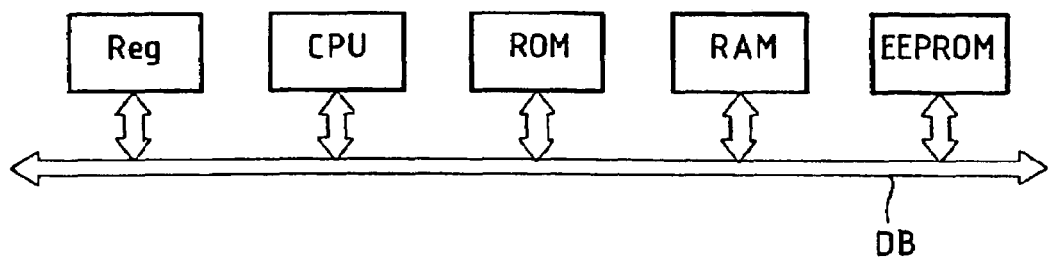
FIG_1    PRIOR ART
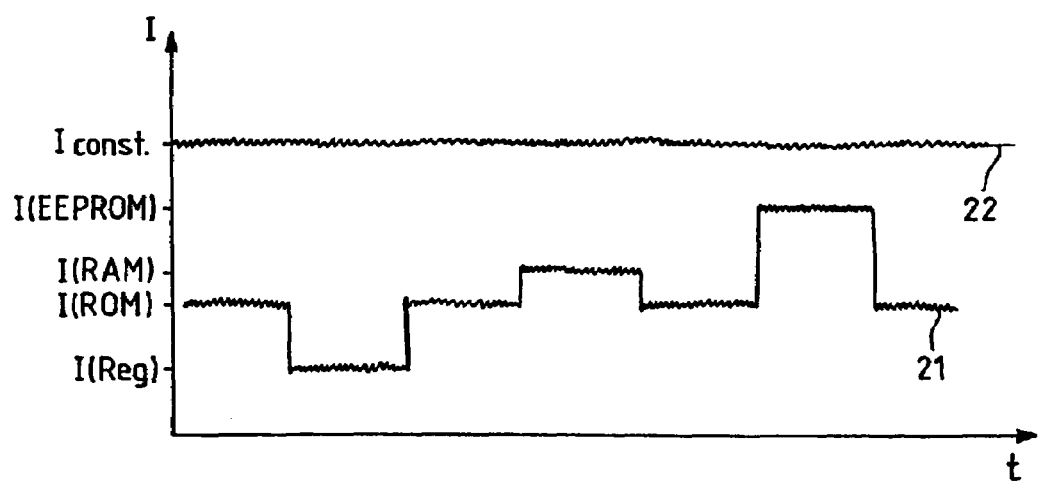
FIG_2    PRIOR ART
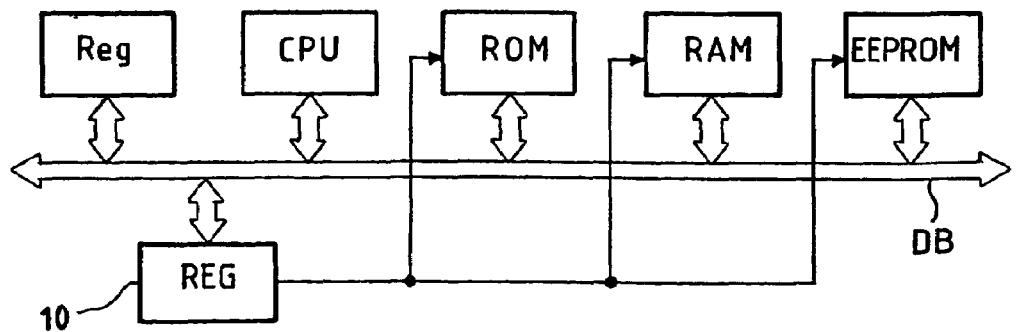
FIG_3

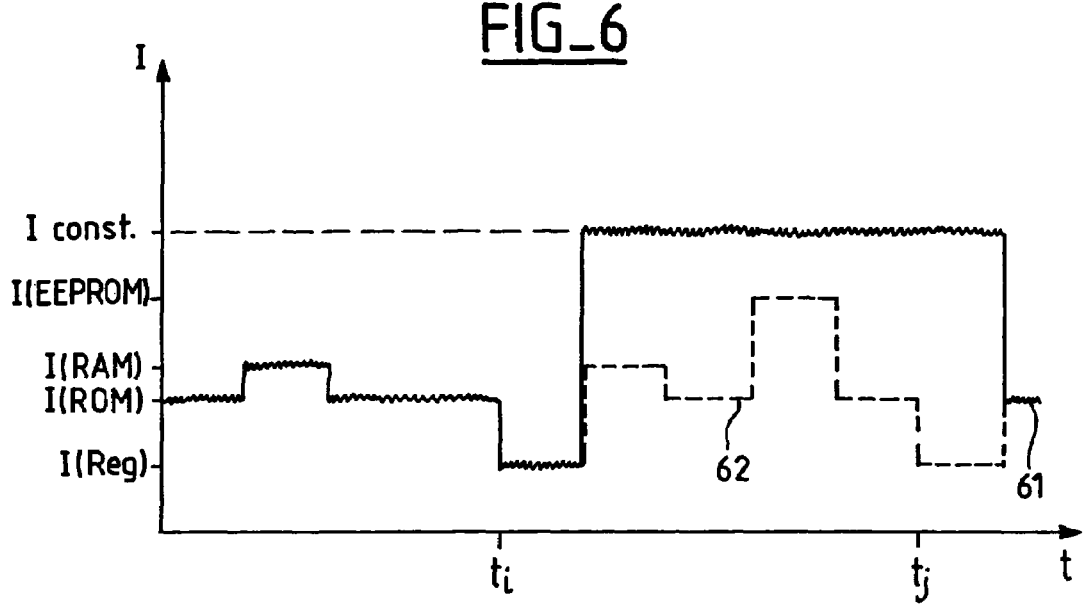
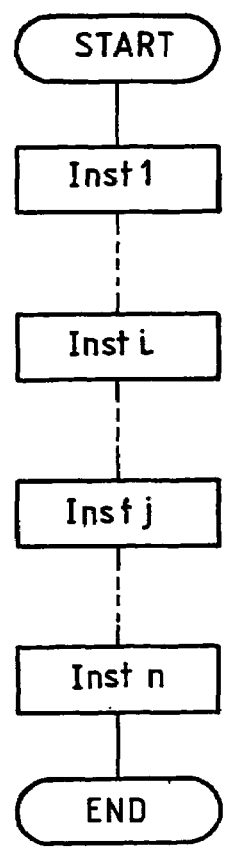
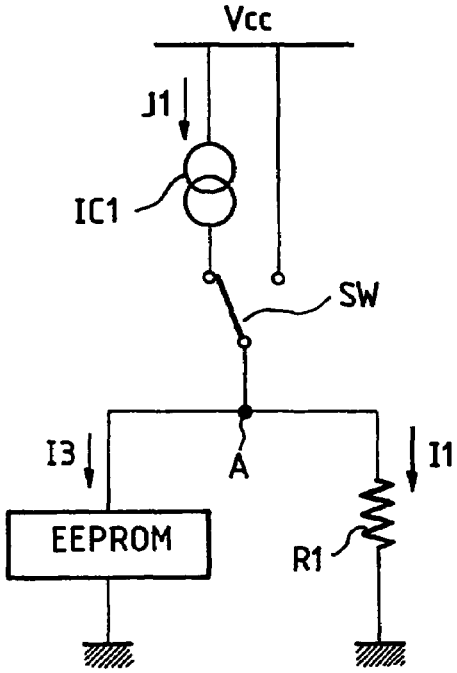

ELECTRIC CIRCUIT MANAGEMENT METHOD AND DEVICE

FIELD OF THE INVENTION

The present invention relates to a method and device for managing an electronic circuit, and in particular a microcontroller of the type comprising a memory for permanently storing confidential information.

BACKGROUND OF THE INVENTION

FIG. 1 is a block diagram showing the internal architecture of such an electronic circuit. A central processing unit (CPU) exchanges data with internal peripheral units by means of a data bus DB. These peripheral units comprise a first read only memory ROM for permanently storing a management program. They also comprise a second read only memory which is an electrically erasable and programmable read only memory (EEPROM) for permanently storing confidential information. They further comprise a random access memory RAM for temporarily storing information connected with the operation of the circuit. In general, they also comprise at least one register Reg for storing binary information.

The invention applies notably to a microcontroller for an IC card, also known as a smart card. The confidential information stored in the EEPROM would for example be a personal code known only to the user. This personal code must be supplied by the user for using an apparatus such as a cash dispenser, a pay TV decoder, a GSM type mobile telephone, etc . . . in combination with the IC card.

The IC card is classically inserted inside a card reader of the apparatus. The IC card comprises contact pads cooperating with corresponding terminals of the reader for exchanging data between the card and the reader, and for supplying electrical power to the IC card using an electrical power supply at the reader. The apparatus comprises a keyboard or similar device by means of which the user enters his personal code. The personal code entered by the user is sent to the microcontroller of the IC card, which comprises means for comparing it with the personal code stored in the EEPROM. In case of agreement, the user is given access to the service provided by the apparatus.

A typical attempt to fraud consists in using a stolen IC card in a pirated IC card reader comprising means for observing the data placed on the data bus DB. It is then theoretically possible to see on the data bus DB the confidential data corresponding to the user's personal code when these data are read from the EEPROM and inserted on the data bus DB. The only difficulty for the pirate user is knowing at what precise moment these data appear on the data bus DB so as to identify them amongst the flow of data transiting on that bus when the electronic circuit is in operation.

Now, it is observed that the electrical current consumed by the electronic circuit during operation is not constant but exhibits variations as a function, amongst others, of the reading operations carried out in different memories of the electronic circuit. Indeed, the memory cells of the different memories exhibit an impedance which, to a certain extent, depends on the programmed or erased state of the cell but which—to a larger extent—varies from one type of memory to another.

In FIG. 2, curve 21 thus indicates the time variations of the electrical current I consumed by the microcontroller during operation. This current can take on different increasing values I(Reg), I(ROM), I(RAM), I(EEPROM) for read-out operations respectively in the register Reg, the ROM memory, the RAM memory or the EEPROM memory. Accordingly, in order to know the confidential data read from the EEPROM it only requires the pirate user to observe the instantaneous electrical current consumed by the microcontroller (using appropriate means such as an ammeter in series between a power supply terminal of the reader provided for electrically supplying the IC card and the corresponding contact pad of the latter) and to note down the data present on the data bus DB at the moment when this current exhibits the value I(EEPROM).

In order to prevent this type of fraud, there has already been proposed means for masking the variations in the current consumed by the electronic circuit during operation, such means acting so that the current consumed by the electronic circuit in operation continuously has a same value Iconst. The latter is greater than the highest current normally consumed by the electronic circuit during operation. An example of such means is described in patent application EP-A-0 500 461, where they are used to mask variations in the consumed current during a memory readout operation due to the programmed or erased state of the memory cells. They comprise for instance a constant current source (of constant value Iconst) connected in series with the memory cells between the positive power supply terminal Vcc and ground, as well as resistor connected in parallel with the memory cells.

In FIG. 2, the current (constant at value Iconst) consumed by the electronic circuit according to this prior art is depicted by curve 22, which substantially corresponds to a horizontal line. The weak ripples in curves 21 and 22 correspond to spurious impedances in the electronic circuit.

This known solution nevertheless has the drawback of significantly increasing the electronic circuit's current consumption. Indeed, the current consumed by the electronic circuit in operation is continuously equal to the value Iconst which is greater than the maximum value of the current consumed in itself by the electronic circuit during operation. This high consumption generates problems connected notably with temperature rises in the electronic circuit due to the Joule effect.

SUMMARY OF THE INVENTION

The invention aims to overcome the above-mentioned drawbacks of the prior art electronic circuits.

To this end, the invention proposes a method of managing an electronic circuit, for example of the type comprising a memory for storing confidential information, characterized in that it comprises masking variations of the electrical current consumed by the electronic circuit, during a fraction of the time only, at least during the portion(s) of time during which an instruction bearing on confidential data is executed.

Notably, but not specifically, the method involves masking variations in the current consumed by the electronic circuit during a portion of time during which is executed, amongst others, a memory readout instruction.

The invention also proposes an electronic circuit, notably a microcontroller, for example of the type comprising a memory for storing confidential information, which comprises means for masking variations in the electrical current consumed by the electronic circuit in operation as well as means for the selective activation and deactivation of the masking means.

The adjective "selective" is understood to mean a deliberate activation and deactivation, i.e. provoked deliberately when they are necessary for obtaining the sought-after technical effect, namely masking variations in the current consumed by the electronic circuit when an operation concerning confidential data is being executed, but not to mask them permanently so as not to excessively increase the average electrical consumption of the electronic circuit.

By virtue of the invention, the current consumed by the electronic circuit is only equal to a constant maximum value during a fraction of the time, whereupon the overall consumption of the circuit is reduced.

However, the masking of the variations in the current consumed by the electronic circuit is effective during the time periods notably when instructions for reading out confidential data are executed, whereupon it is very difficult, if not impossible, to detect the exact moment when these data appear on the data bus DB.

BRIEF DESCRIPTION OF THE DRAWINGS

Other characteristics and advantages of the invention shall become more apparent from the description which follows. The latter is purely illustrative and is to be read in conjunction with the appended drawings in which:

FIG. 1, already described, is a block diagram showing the internal architecture of an electronic circuit according to the prior art;

FIG. 2, also already described, shows curves of the current consumed by the electronic circuit in operation respectively without and with masking of the variations according to the prior art;

FIG. 3 is block diagram showing the internal architecture of an electronic circuit in accordance with the invention;

FIG. 4 shows schematically the masking means according to the invention;

FIG. 5 is a flow chart for a sequence of instructions of a management program for an electronic circuit according to the invention; and FIG. 6 shows curves of current consumed by the electronic circuit in operation, respectively without and with masking of the variations according to the invention.

DETAILED DESCRIPTION OF PREFERRED EMBODIMENTS

FIG. 3, where the same elements as in FIG. 1 have the same references, shows an electronic circuit according to the invention. It comprises a central processing unit CPU, a first read only memory for permanently storing a management program that can be executed by the central processing unit CPU and a second read only memory EEPROM (electrically erasable programmable read only memory) for permanently storing confidential information. It further comprises a random access memory RAM for temporarily storing information connected with the operation of the circuit. Moreover, it also comprises at least one register Reg for storing a binary information.

According to the invention, the electronic circuit further comprises such a register identified by reference numeral 10, which has a specific function according to the invention. Depending on the state of this register, the means for masking variations in the current consumed by the ROM, RAM et/or EEPROM memories are activated or deactivated. In other words, there is stored in register 10 a determined logic value or the complementary logic value, to respectively activate or deactivate the means masking the current consumed by the electronic circuit.

FIG. 4 shows masking means as regards the EEPROM memory. These masking means schematically comprise a current source IC1 connected in series with the EEPROM memory via a switch SW, between a positive supply node receiving a positive power supply voltage Vcc and ground. The node between the switch SW and the EEPROM memory is denoted A. A resistor R1 is connected in parallel with the terminals of the EEPROM (between node A and ground).

In a first state of switch SW, corresponding to the activation of the masking means, node A is connected to the negative terminal of the current source IC1, whereupon the current J1 delivered by the source IC1 flows across the EEPROM in the form of a current I3 on the one hand and/or across resistor R1 in the form of a current I1 on the other hand. It is established that the sum I1+I3 of the currents I1 and I3 is constant and equal to the current J1, even when a readout operation in the EEPROM memory is being carried out.

As will have been understood, the value of R1 must be comprised between the minimum value and the maximum value of the impedance of the EEPTROM memory to play the role of compensating the variations of current I3 during the operation of the microcontroller. Naturally, the value of J1 must exceed the maximum value of current I3 during operation of the microcontroller (this maximum value is reached during an operation carried out in the EEPROM memory). In a limiting case, the current I1 can conceivably be zero.

In a second state of switch SW, corresponding to a deactivation of the masking means, node A is connected directly to the terminal that receives the power supply voltage Vcc, whereupon current source IC1 gives out no current to the EEPROM nor to resistor R1 (this source is turned off). A current I3 and/or a current I1 flows respectively across the EEPROM memory and/or resistor R1 directly from the supply terminal delivering the voltage Vcc. Their values, which can be very weak, are determined by the impedance of the EEPROM with respect to R1. The sum I1+I3 of the currents I1 and I3 is not constant. In particular, it varies when a readout operation is carried out in the EEPROM memory. It can be very weak, especially when no operation is being carried out in the EEPROM memory. In any case, it is lower than the value of the current J1 of the first case discussed above, whereupon there is achieved a saving in the current consumed by the microcontroller.

The structure of the masking means shown in FIG. 3 is purely schematic. Such means can be materialized in any appropriate manner, notably using transistor based circuitry, for example with MOS transistors.

Returning to FIG. 3, it will be understood that each memory of the microcontroller, namely the RAM, ROM and EEPROM memories are provided with masking means such as shown in FIG. 4. The state of switch SW and of its masking means is controlled by the logic value stored by the register 10. In other words, the activation or deactivation of the memory masking means of the microcontroller is a function of the state of the register 10. There shall now be described the manner in which this state is modified in order to activate or deactivate the masking means.

FIG. 5 shows a sequence of instructions of a microcontroller management program which is stored in the ROM memory. This program is written as a function of the microcontroller's application and is stored in the ROM memory. As is already known, the instructions contained in this program are executed sequentially during operation of the microcontroller.

Between a program start instruction START and a program end instruction END, the program comprises a sequence of instructions $Inst_1, \ldots, Inst_n$. Among these instructions, a specific instruction $Inst_i$ has the effect of writing a particular logic value in the register 10, for example logic value 1, whereupon switch SW is set into the first above-mentioned state. Another instruction $Inst_j$ subsequent to instruction $Inst_i$ in the sequence, has the effect of writing the complementary logic value in the register 10, namely for example logic value 0, whereupon switch SW is set into the second above-mentioned state.

As will have been understood, these two instructions $Inst_i$ and $Inst_j$ are inserted in the sequence of instructions of the management program so as to frame, amongst others, an instruction for reading out from the EEPROM memory. In this manner, the confidential information read from the EEPROM memory transit along the data bus DB while the masking means J1, SW, R1 of the memories are activated.

It goes without saying that masking means are activated by the instruction $Inst_i$ sufficiently in advance of the readout instruction and are deactivated by the instruction $Inst_j$ sufficiently long after the said readout instruction for the masking of the variations in the current consumed to be effective. In other words, the process according to the invention comprises the masking of the variations of the current consumed by the electronic circuit for a portion of time during which, amongst others, an instruction to read out from the EEPROM is executed. However, the masking must be sufficiently long so as to make the readout operation from the EEPROM memory not easily detectable. It is clear that if the masking means were activated only during the readout operation, the sought after masking effect would not be obtained.

Conversely, the portion of time during which the masking means are to be activated i.e. the time period between the instructions $Inst_i$ and $Inst_j$, is sufficiently short for the economy in the current consumed by the electronic circuit to be substantial in comparison with the continuous masking means according to the prior art.

It is for this reason that it is stated that the activation and deactivation of the means for masking variations in the current consumed by the electronic circuit are selective.

FIG. 6, which is to be compared with FIG. 2, shows a curve 61 expressing the variation in time of the electric current I consumed by the electronic circuit operating in accordance with the principle of the invention. The means for masking memories of the microcontroller are activated at an instant $t_i$ and are deactivated at a later moment $t_j$ respectively by the execution of instruction $Inst_i$ and by the execution of instruction $Inst_j$.

In the portion of time comprised between these two instants $t_i$ and $t_j$, the current consumed by the electronic circuit is constant and equal to Iconst. In particular, it does not vary as a function of the readout operations carried out in the ROM, RAM and/or EEPROM memories. In this way, a pirate user is unable to determine at which precise moment the data inserted on the microcontroller's data bus correspond to the personal code of the IC card. Curve 62 in broken lines shows what the current consumed by the microcontroller would look like between the instants $t_i$ and $t_j$ without the activation of the masking means according to the invention.

In the example, the value Iconst corresponds substantially to the sum of the currents J1 of the means for masking the ROM, RAM and EEPROM activated simultaneously between the instants $t_i$ and $t_j$. Note that the currents J1 do not necessarily have the same value for each of the ROM, RAM and EEPROM memories.

In addition, it is not mandatory for masking means to provided for each of the memories of the microcontroller.

In another embodiment, masking means can be provided elsewhere than in the memories. For example, a single masking means can be provided directly in proximity to the contact pad serving for the electrical power supply of the IC card. However, single masking means arranged in such a manner are easier to get around for a pirate user.

The invention has been described above in connection with the masking of variations of the current consumed by the electronic circuit during execution, amongst others, of an instruction for reading from a memory storing confidential information. It is clear, however, that it is not limited to that case. On the contrary, it applies to the masking of variations in the current consumed by the electronic circuit during execution, amongst others, of any operation involving confidential data.

What is claimed is:

1. A method for controlling an electronic circuit, said method comprising the steps of:
   executing instructions, at least one of the instructions operating on confidential data;
   masking variations in the current consumed by the electronic circuit by keeping the current consumed by the electronic circuit substantially constant during only a portion of the operating time of the electronic circuit, which at least includes the time during which the instruction operating on confidential data is executed but does not include the entire operating time of the electronic circuit;
   activating a circuit for masking variations in the current consumed by the electronic circuit by executing of a first instruction; and
   deactivating the circuit for masking variations in the current consumed by the electronic circuit by executing a second instruction,
   wherein the first instruction is executed some time before the instruction operating on confidential data is executed, and the second instruction is executed some time after the instruction operating on confidential data is executed.

2. The method as defined in claim 1, wherein the portion of the operating time during which variations in the current consumed by the electronic circuit are masked includes the time during which an instruction for reading from a memory containing confidential data is executed.

3. The method as defined in claim 1, wherein the first instruction causes a predetermined logic value to be written in a register of the electronic circuit, and the second instruction causes a complementary logic value to be written in the register.

4. A tangible computer-readable medium encoded with a program for controlling an electronic circuit, said program containing instructions for performing the steps of:
   operating on non-confidential data;
   operating on confidential data;
   masking variations in the current consumed by the electronic circuit by keeping the current consumed by the electronic circuit substantially constant during only a portion of the operating time of the electronic circuit, which at least includes the time during which the confidential data is operated on but does not include the entire operating time of the electronic circuit;

activating a circuit for masking variations in the current consumed by the electronic circuit through a first instruction; and deactivating the circuit for masking variations in the current consumed by the electronic circuit through a second instruction, wherein the first instruction is executed some time before the confidential data is operated on, and the second instruction is executed some time after the confidential data is operated on.

5. The tangible computer-readable medium as defined in claim 4, wherein the portion of the operating time during which variations in the current consumed by the electronic circuit are masked includes the time during which a read from a memory containing confidential data is performed.

6. The tangible computer-readable medium as defined in claim 4, wherein the first instruction causes a predetermined logic value to be written in a register of the electronic circuit, and the second instruction causes a complementary logic value to be written in the register.

7. An electronic circuit having a memory for storing confidential information, said electronic circuit comprising:

a masking circuit for masking variations in the electrical current consumed by the electronic circuit by keeping the current consumed by the electronic circuit substantially constant during only a portion of the operating time of the electronic circuit, which at least includes the time during which an instruction operating on confidential data is executed but does not include the entire operating time of the electronic circuit; and a selection circuit for selectively activating and deactivating the masking circuit, the selection circuit activating the masking circuit when a first instruction is executed, and deactivating the masking circuit when a second instruction is executed, wherein the first instruction is executed some time before the instruction operating on confidential data is executed, and the second instruction is executed some time after the instruction operating on confidential data is executed.

8. The electronic circuit as defined in claim 7, further comprising a register coupled to the selection circuit, the selection circuit activating or deactivating the masking circuit in accordance with a logic value stored in the register.

9. The electronic circuit as defined in claim 8, further comprising: a central processing unit; a first read-only memory for storing a control program for execution by the central processing unit; and a second read-only memory for storing the confidential information.

10. The electronic circuit as defined in claim 9, wherein the control program includes: the first instruction which causes a predetermined logic value to be written into the register, and the second instruction which causes a complementary logic value to be written in the register.

11. The electronic circuit as defined in claim 10, wherein the control program further includes a third instruction which is the instruction operating on the confidential information, and in the control program, the first instruction is before the third instruction, and the second instruction is after the third instruction.

12. The electronic circuit as defined in claim 11, wherein the third instruction causes the confidential information to be read from the second read-only memory.

13. An information processing system including at least one electronic circuit having a memory for storing confidential information, said electronic circuit comprising:

a masking circuit for masking variations in the electrical current consumed by the electronic circuit by keeping the current consumed by the electronic circuit substantially constant during only a portion of the operating time of the electronic circuit, which at least includes the time during which an instruction operating on confidential data is executed but does not include the entire operating time of the electronic circuit; and a selection circuit for selectively activating and deactivating the masking circuit, the selection circuit activating the masking circuit when a first instruction is executed, and deactivating the masking circuit when a second instruction is executed, wherein the first instruction is executed some time before the instruction operating on confidential data is executed, and the second instruction is executed some time after the instruction operating on confidential data is executed.

14. The information processing system as defined in claim 13, wherein the electronic circuit further comprises a register coupled to the selection circuit, the selection circuit activating or deactivating the masking circuit in accordance with the logic value stored in the register.

15. The information processing system as defined in claim 14, wherein the electronic circuit further comprises:

a central processing unit;

a first read-only memory for storing a control program for execution by the central processing unit; and a second read-only memory for storing the confidential information.

16. The information processing system as defined in claim 15, wherein the control program includes the first instruction which causes a predetermined logic value to be written into the register, the second instruction which causes a complementary logic value to be written in the register, and a third instruction which is the instruction operating on the confidential information, and in the control program, the first instruction is before the third instruction, and the second instruction is after the third instruction.

* * * * *